Oct. 20, 1936.  J. S. ALSPAUGH  2,057,810
GEAR SHIFT MECHANISM
Filed April 5, 1935  4 Sheets-Sheet 2
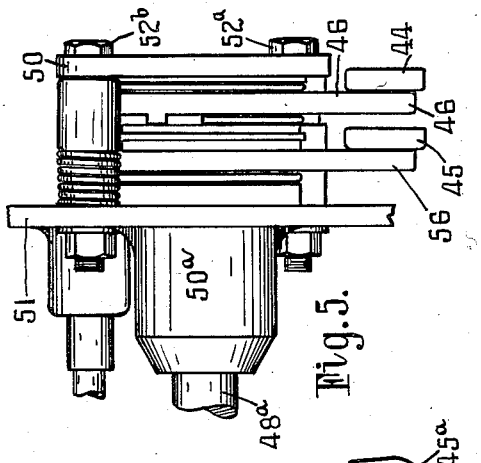
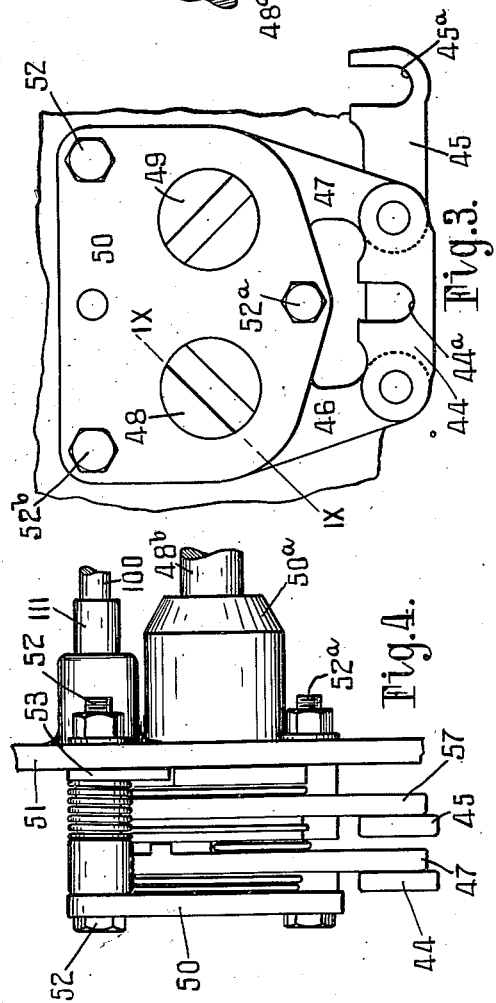
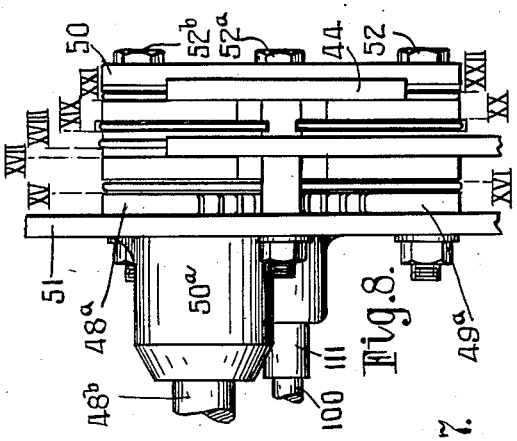
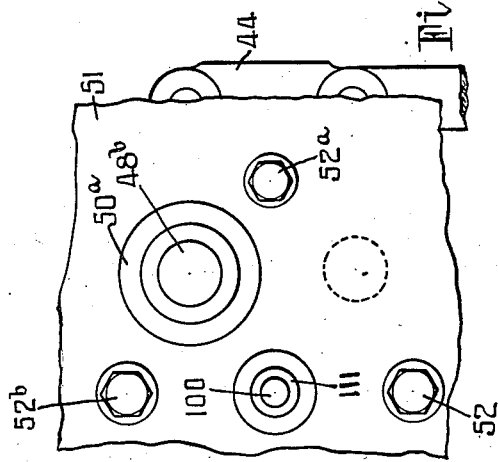
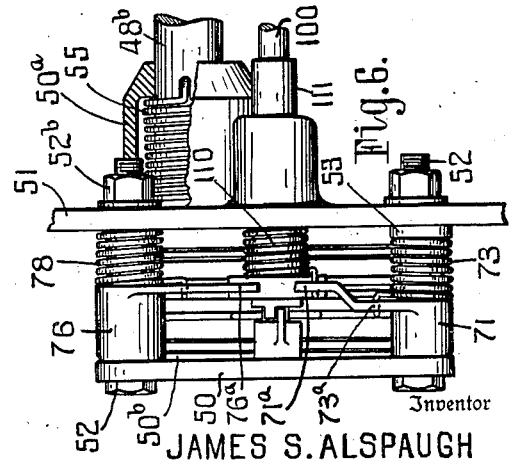
Inventor
JAMES S. ALSPAUGH Oct. 20, 1936.   J. S. ALSPAUGH   2,057,810
GEAR SHIFT MECHANISM
Filed April 5, 1935   4 Sheets-Sheet 3
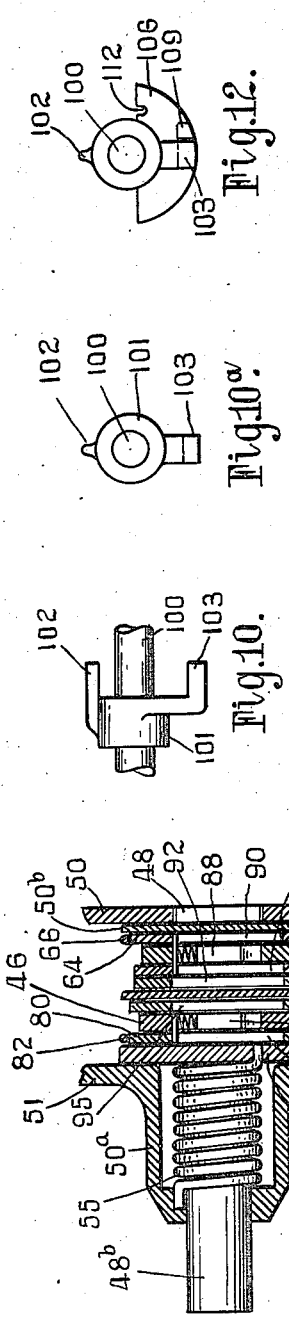
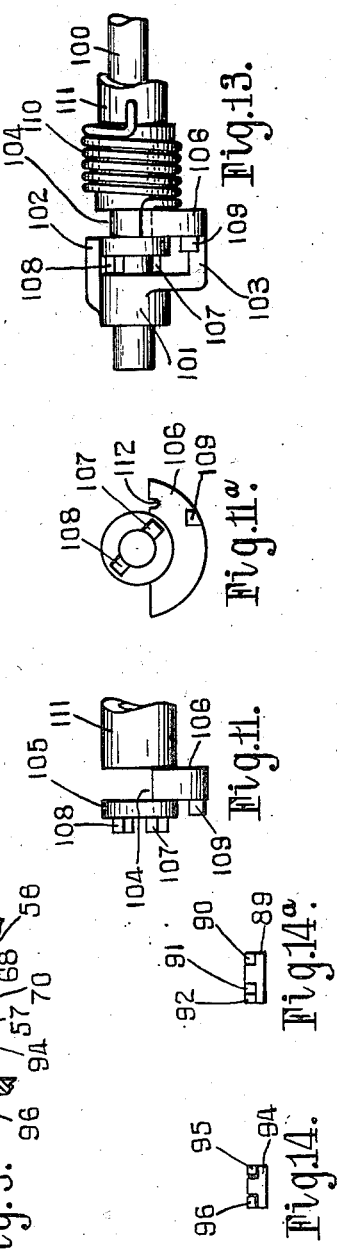
Inventor
JAMES S. ALSPAUGH
Attorneys

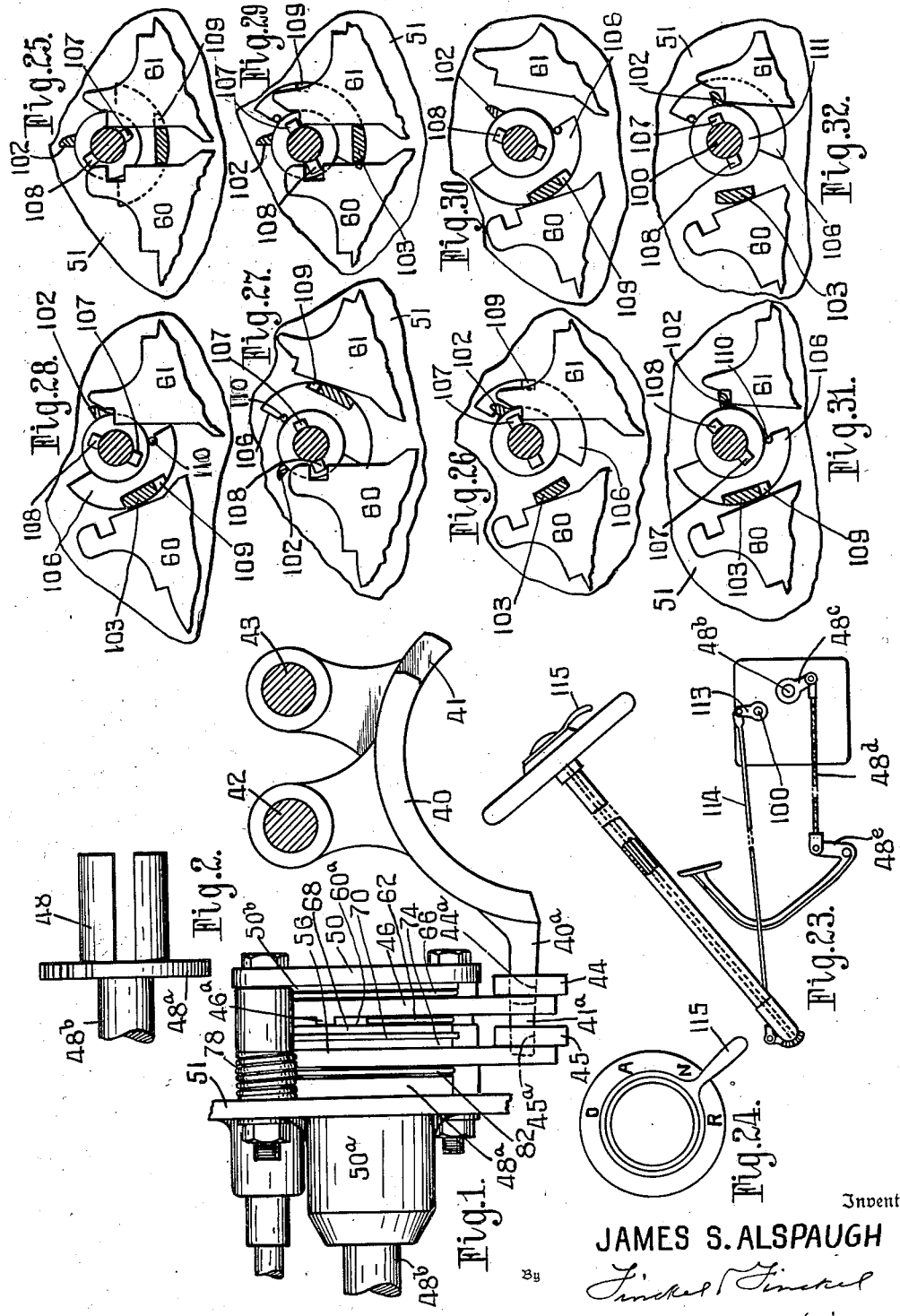

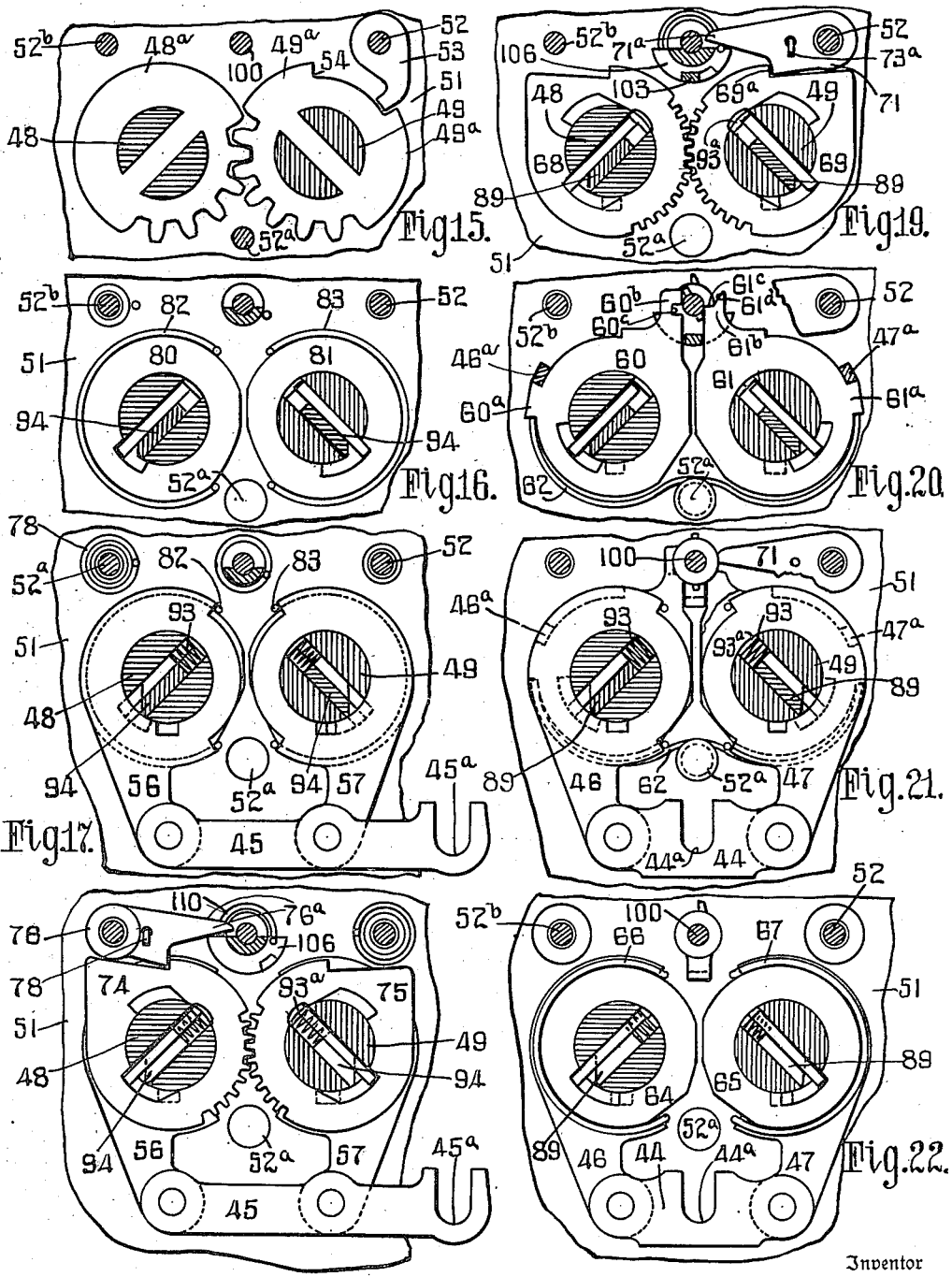

Patented Oct. 20, 1936

2,057,810

UNITED STATES PATENT OFFICE 2,057,810

GEAR SHIFT MECHANISM

James S. Alspaugh, Columbus, Ohio

Application April 5, 1935, Serial No. 14,951

22 Claims. (Cl. 74—334)

The present invention relates more particularly to a motor vehicle gear shift mechanism of the selective type, such as used in the "Cadillac" and many other cars. In this sort of mechanism the speed is changed by shifting two yokes carried by slidingly supported parallel rods, one of which yokes controls the obtaining of low and reverse speed and the other of which controls the obtaining of intermediate (or second) and high speeds.

I have heretofore invented several varieties of mechanism for changing speeds by the operation of the pedal of the clutch lever and/or other pedal and thereby dispensing with the hand lever for performing that work. One such mechanism is illustrated in Letters Patent of the United States issued to me February 9, 1932, No. 1,844,550.

The principal object of the present invention is to provide a mechanism whereby with one suitable preliminary manual setting and an actuation of the foot lever, either low, reverse or second can be obtained or alternation between reverse and low can be obtained, and further with one preliminary manual setting and by successive actuations of the foot lever alternate shifting between second and high can be obtained. A further object of the invention is to provide means whereby shifting from the low and reverse side to the second and high side is automatic.

Another object of the invention is to provide a simplified and compact mechanism and at the same time increase its efficiency and capability as compared with former mechanisms.

Further objects will appear from the disclosure herein.

In the accompanying drawings showing an embodiment of the invention—

Figure 1 is a view mainly in elevation of the mechanism with the gear shift rods in cross section.

Fig. 2 is an elevation of a forked shaft (of which there is a cooperating pair) and on which the shifter and selector plates are assembled and between the forks of which are placed the latches for engaging the shifter plates and also the pins for engaging the selector plates.

Fig. 3 is a view in elevation of the right hand side of the mechanism, as shown in Fig. 1, with the yoke supporting rods omitted.

Fig. 4 is an elevation of the right hand end of Fig. 3.

Fig. 5 is an elevation of the left hand end of Fig. 3.

Fig. 6 is a top plan view of the mechanism with parts broken off.

Fig. 7 is an elevation of the right hand side of Fig. 6.

Fig. 8 is a bottom view of the mechanism or looking at the right hand side of Fig. 7.

Fig. 9 is a section on line IX—IX Fig. 3, looking down.

Figs. 10 and 10a are side and end views respectively of the selector shaft and key.

Figs. 11 and 11a are side and end views respectively of the selector lifter sleeve.

Fig. 12 is an end view of the parts of Figs. 10 and 11 assembled.

Fig. 13 is a side view of the same.

Figs. 14 and 14a are end views of the two forms of latches and pins employed in the fork shaft.

Fig. 15 is a section through the fork shafts on line XV, Fig. 8, looking to the right.

Fig. 16 is a section through the fork shafts on line XVI, Fig. 8, looking to the right and showing a pair of the selector plates.

Fig. 17 is a section through the fork shafts on the line XVII, Fig. 8, looking to the right and showing a pair of the shifter plates for automatically shifting between high and second.

Fig. 18 is a section through the fork shafts on the line XVIII, Fig. 8, showing a pair of neutral plates for high and second (or intermediate) speeds.

Fig. 19 is a section through the fork shafts on the line XIX, Fig. 8, looking to the right and showing a second pair of neutral plates for low and reverse speeds.

Fig. 20 is a section through the fork shafts on the line XX, Fig. 8, showing the pair of selector plates to be set manually from the driver's seat for selecting either reverse or low speed out of neutral.

Fig. 21 is a section through the fork shafts on the line XXI, Fig. 8, looking to the right and showing a pair of shifter plates for low and reverse speeds.

Fig. 22 is a section through the fork shafts on the line XXII, Fig. 8, looking to the right showing the selector plates for automatically causing automatic shifting between low and reverse speeds.

Fig. 23 is a detail view on a smaller scale showing the steering post of a motor vehicle provided with a shaft and a suitable gear connection with the selector setting shaft whereby the selected shift of the gears is rendered possible by the operation of the clutch pedal.

Fig. 24 is a plan view of the "quadrant", so called, and a handle for operating the selector shaft referred to in the description of Fig. 22.

Figs. 25 to 32, both inclusive, are detail views, on a larger scale than in Figs. 15–22, showing various positions of the selector shaft, key and sleeve in the steering mechanism in the operation of the gear shift selecting and control mechanism.

The two yokes for shifting the gear clutches for engaging different gears are shown at 40 and 41 Fig. 1, that at 40 being the low and reverse yoke, and that at 41 being the second (or intermediate) and high. Said yokes are supported for reciprocation horizontally by rods 42 and 43. The yoke 40 has a lateral extension 40$^a$ that engages a slot 44$^a$ in link 44 while the yoke 41 engages a slot 45$^a$ in link 45.

The link 44 connects downwardly extending arms of a pair of shifter plates 46 and 47 for the low and reverse, said plates journaled respectively on a pair of fork shafts 48 and 49. One of said fork shafts is shown in Fig. 2, the forks of said shafts being equal segments of the same cylinder having their flat faces parallel to each other to provide a free space between them. Each of said fork shafts is mounted to rock in walls 50 and 51, the latter secured together by spacer bolts 52, 52$^a$ and 52$^b$. Each of said fork shafts is provided at one of its ends with a projecting rim 48$^a$ and 49$^a$ and each of said rims has gear teeth engaging the other, as seen in Fig. 15, so that they rock in opposite directions when one of them (the shaft 48) is rocked.

The rocking movements of the fork shafts 48 and 49 are limited to a definite arc by stop pawl 53 having its toe positioned in a recessed portion 54 of the rim 49$^a$, as shown in Fig. 15. The normal or neutral position of said rock shafts 48 and 49 is that shown in Fig. 15, said rock shafts being yieldingly held in said position by a coiled spring 55 engaging at one end the rim 48$^a$ of shaft 48 and at its other end a confining cap 50$^a$ on the wall 51.

A projecting portion 48$^b$ of the fork shaft 48 has connected to it a crank arm 48$^c$ that in turn is connected by a cable 48$^d$ with the clutch pedal 48$^e$ (see Fig. 23) to rock said fork shaft and its companion fork shaft 49 against the torque of said coil spring 55. (See Fig. 6.)

56 and 57 designate the shifter plates for the second and high speeds, their downwardly extending arms being connected by the link 45 and they also are mounted rockably on the shafts 48 and 49 respectively. Said shifter plates 56 and 57 are of substantially the same form as the shifter plates 46 and 47 except that the shifter plates 46 and 47 are provided at their rims with lateral lugs 46$^a$ and 47$^a$ for engaging and actuating an adjacent selector plate 60 or 61 of low and reverse function to release that plate and hold it out of position to be actuated by the setting means while the shifter plate is in shifted position.

The said selector plates 60 and 61 adjacent the shifter plates 46 and 47 respectively are shown in Fig. 20 and partially by broken lines in Fig. 21, said selector plates being normally held in closed or neutral position by a bow spring 62 having a middle loop engaged with the lower spacer bolt 52$^a$ before referred to. The arms of said bow spring 62 embrace the selector plates 60 and 61 with the ends thereof pressing against rim lugs 60$^a$ and 61$^a$ tending to hold them yieldingly against the action of the setting shaft 100. The upper portion of the plates 60 and 61 are recessed arcuately as shown in respect to the axis of movement thereof on the fork shaft to form the shoulders against which the lugs 46$^a$ and 47$^a$ act. The plate 60 has an upward extension 60$^b$ provided at its inner edge with a rectangular notch 60$^c$; and the plate 61 has an upward extension 61$^b$ provided at its top with a shoulder 61$^c$ and an upwardly and outwardly inclined edge 61$^d$ for the purpose hereinafter appearing.

On the fork shafts between the shifter plates 46 and 47 and a spacer plate 50$^b$ against the wall 50 are automatic selector plates 64 and 65. Each of said plates 64 and 65 is encircled partially at its rim by a spring as shown at 66 and 67 in Fig. 22. The opposite ends of each of said springs is bent to project in front of shoulders on the shifter plates 46 and 47. The function of these springs 66 and 67 is to provide yielding or braking friction between the said shifter plate and said selector plate, and the rocking of the selector plate by the rocking movements of the fork shafts which carry engaging pins as hereinafter set forth.

On the fork shafts beyond the plates 60 and 61 and next an intermediate spacer plate 70 are neutralizing plates 68 and 69 having gear toothed portions on their rims engaging each the other so as to communicate the motion of one to the other. The upper right hand portion of the rim of the plate 69 (Fig. 19) is made with a notch forming a shoulder 69$^a$ adapted to be engaged by the sleeve pawl 71 that in turn is pressed by the end 73$^a$ of a coil spring 73 (see Fig. 6) to yieldingly and normally hold said pawl engaged with said shoulder. Said pawl 71 is pivoted on the spacer bolt 52, and has a nose 71$^a$ that extends into position to be actuated by a setting and lifting segment member 106 to be hereinafter referred to. The form of the rim of the plate 69 below the pawl 71 is such that it cooperates with the pawl and bolt 52 in forming a stop to limit the rotation of the plates toward each other at their tops when the plates are in normal and the neutral position of the mechanism.

It may be observed at this juncture that the various plates, illustrated in Figs. 19 to 22, inclusive, constitute a group located at the right hand side of the intermediate spacer plate 70 (as shown in Fig. 9) designed primarily to operate in effecting the low and reverse speed operations. The group of plates at the left hand side of said middle spacer plate as shown in Fig. 9, is designed for cooperating in controlling the operation of the second and high speed gear shifts, such plates being shown in greater detail in Figs. 16 to 18, both inclusive. These latter I will now proceed to describe as to further details thereof.

Referring first to Fig. 17 the shifter plates 56 and 57 which, as before stated, are of substantially the same form as the shifter plates 46 and 47, said shifter plates 56 and 57 being mounted to rock on the fork shaft in each case at the left of the middle spacer plate 70 as shown in Fig. 9. But mounted on said fork shafts between said shifter plates 56 and 57 and the middle spacer plate 70 are neutralizing plates 74 and 75 (see Fig. 18). Said neutralizing plates 74 and 75 are substantially identical with the plates 68 and 69, Fig. 19, but the pawl sleeve 76 (like that shown at 71, Fig. 19) for locking said plates is pivoted on the near left hand spacer bolt 52$^a$ (as in Fig. 18), said sleeve pawl 76 also having a nose 76$^a$ yieldingly and normally held down in locking position against the shoulder on the plate by a coil spring 78 engaging the pawl with the pressure thereof. The nose of said sleeve pawl 76 extends into position to be actuated by the segmental setting or lifting member 106 referred to in connection with the description of Fig. 19. It may be observed in Fig. 6 that the nose of the sleeve pawl 71 is bent to extend over said setting or lifting device, whereas the nose of sleeve 76 is unbent to so extend. This fact makes no difference in the operation but is convenient in the construction because of the interposition of the pawl 53 on pin 52.

On the fork shafts at the opposite side of the shifter plates 56 and 57 and next to the rim 48ª and 49ª of said fork shafts is a pair of automatic selector plates 80 and 81 having their rims engaged by partially encircling friction or braking springs 82 and 83. The opposite ends of each of said springs are bent to project in front of a shoulder on the shifter plates 56 and 57. The function of these springs 82 and 83 is to provide friction between said shifter plates 56 and 57 and said selector plates 80 and 81 but permitting the selector plates to be moved by the rocking movements of the fork shafts which carry engaging pins as hereinafter set forth.

Each of the fork shafts 48 and 49 is provided with two latches 89 and 94 of T-form in cross section and beveled as shown at their lower ends. The head or base of said T-latch 89 which is for the low and reverse group of shifter and companion plates supports three key pins 90, 91 and 92. The latches 94 for the second and high group of shifter and companion plates each support two key pins 95 and 96. Said latches are slidably supported in and guided by the parallel walls of the tangs of the fork shafts and by the spacer plates 70 and 58ᵇ, and each of said latches is normally pressed by a spring 93 located between its upper or unbeveled end and a small abutment piece 93ª resting against the inner rim of the shifter and selector plates. The unbeveled faces of the latches in the two fork shafts face each other. The function of the latch is to actuate the shifter plate that is duly selected for operation either directly or automatically and the function of the pins generally is to move or actuate the contiguous selector plates and neutralizing plates.

The cooperation of the latches and pins just described with the shifter and selector plates is best shown in Figs. 16–19, both inclusive, and will be first described.

In the operation of the mechanism only one latch at a time can engage with its shifter plate, the other latches being held from engagement with their shifter plates by the neutral and selector plates because the latter close the recess in such other shifter plate.

It should be noted that the shifter plates of the low and reverse side each have three companion plates; and that the shifter plates of the second and high side have two companion plates. The selector plate and the neutralizing plate in each instance has at its inner rim a recess into which the lower ends of the coinciding key pins normally extend in operating position. Each of said plates also has a recess in its inner rim into which the latching member is projected by its spring only when the recess in the shifter plate is brought into transverse coincidence with the recesses of the companion selector plates. In the views of Figs. 15–22 the recesses nearer the reader of the drawings are shown by full lines, while the recesses on the plates next in rear are indicated by broken lines. Whenever in the last described condition a latch is so projected into the recess of its shifter plate it is in position to be operated by the clutch lever to move the shifter plate to a shifted position. On the return movement of the fork shafts due to the reaction of the coil spring 55 the shifter plates remain in shifted position while the selector plates and the latch members are restored to their original position unless otherwise held, as will appear in the case of the neutralizing plates.

There is employed in the mechanism means for setting the selector plates to cause the latching engagement of the appropriate latching member with any of the desired shifter plates. The details of this setting means are shown in Figs. 10–13, inclusive, where the character 100 designates a shaft that is mounted horizontally to rotate but fixed against longitudinal movement in the walls 50 and 51 with its axis extending between the upper ends of the selector plates 60 and 61. Secured fixedly on said shaft is a collar 101 having projecting therefrom, parallel to the shaft, an upper bit 102 and lower bit 103. Loose on said shaft 100 is a sleeve 111 having an arcuate groove 104 at one side near one end for a head 105 and at its lower side a segmental lifter member 106. The head 105 has two diametrically located projecting lugs 107 and 108 and the segment has on its forward side near its curved rim a lug 109. On the sleeve 111 in rear of the segmental member 106 is a coil spring 110 having one end attached to wall 51 and its other end engaged with the segmental member at a notch 112, said spring normally, but yieldingly, holding the segment lug 109 against the bit 103.

The shaft 100 has a crank 113 and rod 114 operated by a shaft in the steering post, said shaft having at its upper end at the steering wheel a handle 115 for turning said shaft so that the parts of the setting devices can be rocked from neutral position to move into and set the selector plates at the position necessary to effect the desired latching engagement of the shifter plates and the desired releasing of the neutral plates.

In Figs. 25 to 32, inclusive, are illustrated the different positions of the setting mechanism in effecting selections of some of the different shifts to be made for speed changing.

In Fig. 25 is shown the neutral and normal position of the setting mechanism and the selector plates. The parts as shown in Fig. 26 are in the low speed position. In shifting from neutral to low speed position it is necessary to remove the pawl 71 from its locking position and hold it so removed and swing the plate 60 to cause latching engagement with its companion shifting plate 46. These operations are effected by swinging the quadrant arm 115 downward from "N" to "R" and immediately reversing the swing of said arm to "A". The downward swing of arm from "N" to "R" rotates the shaft 100 anti-clockwise, puts the lug 108 into the notch of the plate 60, and lifts the pawl 71 from its locking position by the swing of the segment 106 which is held there until released. In this movement the bit 103 pushes and holds the plate 61 to open position as seen in Fig. 27. On a further swing of the quadrant arm from the "R" position toward "A" the bit 103 moves again, but in the clockwise direction, independently of the segment 106 until the plate 61 is returned to the shaft 100 with its shoulder under the lug 107, as seen in Fig. 29, while the bit 103 continues to swing and shoves over the plate 60 to the position shown in Fig. 26. In this last position it will be noted that the lug 107 and the segment 106 are now held in fixed position by plate 61. When the plate 60 is in the position shown in Fig. 26 the latch 89 in the plate 60 of the low and reverse group is alined with the recesses in the selector and neutralizing plates but held from movement by the non-recessed portion of the shifter plate until the fork shafts are rocked by a partial operation of the clutch pedal whereupon the latch 89 is moved forward into position to be projected and projected into said alined recesses by its spring while the rest of the latches are held from engagement and the further and final operation of the clutch lever effecting the shifting of the shifter plate and causing gear engagement and then upon the release of the clutch lever the spring 55 reacting restores the rock shafts and selector plates to original position, releases the latch 89 of the shifter plates 46 and leaves the shifter plates in shifted position.

It will be observed that when the quadrant arm in the operation last described is moved from "N" to "R" and then to "A" as a practically continuous operation, the selector parts are set for low gear operation and that when the low gear is shifted into engagement the segment 106 is released and restored by its spring to its normal position with the lug 109 resting against the bit 103, as seen in Fig. 28, thereby releasing also the pawl 71 to its locking position and also thereby locking the neutral plates 68 and 69 and lifting the pawl 76 on the high and second side, and automatically making the selective position as shown in said Fig. 28. The neutralizing plates 74 and 75, it will be seen, are also released for shifting operation on the high and second side. It will be observed in this operation that when the pawl 71 locks the neutralizing plates 68 and 69 of the low and reverse side their companion shifter plates will be restored to neutral position by reason of the slants of the recesses in the neutral plates. In this condition it will not be necessary to farther move the quadrant arm to obtain second or to obtain high, the shifts being accomplished by successive operations of the clutch pedal, because of the automatic selection out of neutral to second by reason of the plates and shoulders of the recesses shown in Figs. 16 and 18. It is also obvious that it is possible to achieve an automatic neutralization out of the thus engaged high or second speed position by a half depression of the clutch pedal which moves the shifter plate to neutral and by a fresh complete operation of the clutch pedal select second automatically out of such neutral, after which the selection is automatic for second and high by successive operations of the clutch pedal. From this condition the quadrant arm can be moved to "O" thereby moving the bit 102 to partially open the plate 61, as shown in Fig. 31, with the bits 107 and 108 disengaged thereby releasing shaft sleeve 111 which is free for movement independently of the shaft 100. From this position the segment 106 can be moved by the shaft sleeve 111 for obtaining low independently of any movement of the quadrant arm. Movement of the quadrant arm to "O" will correct any mistake and error in previous placing of said arm, because the bits 103 and 102 move the selector plates rearward to release said segments.

Figs. 31 and 32 illustrate the result of an independent movement of the segment by its spring 110 to free said segment from the plates 60 and 61. To obtain reverse gear directly it is only necessary to pull the quadrant arm down to "R" and then operate the clutch pedal. This operation will first move any engaged gear to its neutral position and then shove the reverse gear into engagement, and in this last described position of the mechanism successive operations of the pedal will cause alternate shiftings to low and reverse speeds. It is also possible on the reverse and low side with the quadrant arm at "R" and the parts of the setting means as shown in Fig. 27 to release shifting engagement at neutral position by a half stroke of the pedal and upon a fresh stroke of the pedal to select automatically reverse speed out of neutral.

By setting the quadrant arm at "N" thereby putting the parts, as seen in Figs. 25, 18, and 19, with both pawls 71 and 76 in locking position, a full operation of the clutch pedal places the shifting mechanism in normal neutral position. If the clutch pedal be operated when the parts are in said normal neutral position, as shown in Figs. 18 and 19, the fork shafts can be rocked and the pins of the neutral plates companion to the latches will be projected from the positions shown in said views with their upper ends extended into the upper recesses of said plates by reason of the inclines at the inner end of the lower recesses. This operation is provided to guard against jamming the parts when the clutch pedal is operated while the neutral plates are locked. The other plates having such companion pins being yielding are caused to rock harmlessly when the fork shafts are by the clutch pedal rocked inadvisedly and so adjust themselves to normal by the return movement of the rock shafts under the reaction of the spring 55. And in this operation, the setting devices, being in the position shown in Fig. 25 will be separated from each other to positions like those shown in Fig. 30 by reason of the operation of the latches carried by the rock shafts in striking the shoulders of the recesses as seen in Fig. 20.

If all the parts are in the normal neutral position and it is desired to go into second speed the quadrant arm is moved directly from "N" to "A" thereby placing the setting means in the position shown in Fig. 28 and also with the pawl 76 elevated into releasing position as shown in Fig. 18, such second speed gear is directly obtained by a full stroke of the pedal.

The forms of the parts can be changed without departing from the gist of the invention as claimed.

What I claim is:

1. In a gear shift mechanism, two shafts geared together for limited movement in opposite directions and having spring means to hold the same in a normal position at one of the limits of said movements, shifter plates mounted to rock on said shafts, said shifter plates having spaced shoulders, latch members carried by said shafts to engage one of said shoulders to rock said shifter plates in one direction and to be disengaged from said shoulder by movement of said shafts in the reverse direction by said spring means and power actuated means for rocking said shafts against the action of said spring means.

2. In a gear shift mechanism, two shafts geared together for limited movement in opposite directions and having spring means to hold the same in a normal position at one of the limits of said movement, shifter plates mounted to rock on said shafts, said shifter plates having spaced shoulders, latch members carried by said shafts to engage one of said shoulders to rock said shifter plates in one direction and to be disengaged from said shoulder by movement of said shafts in the reverse direction by said spring means, power actuated means for rocking said shafts against the action of said spring means and selector plates rockable on said shafts and companion to said shifter plates, said shifter plates provided with rims and spaced shoulders to control the access of said latch members to the shoulders in the shifter plates.

3. In a gear shift mechanism, two shafts geared together for limited movements in opposite directions and having spring means to hold the same in a normal position at one of the limits of said movements, shifter plates mounted to rock on said shafts, said shifter plates having spaced shoulders, latch members carried by said shafts to engage one of said shoulders to rock said shifter plates in one direction and to be disengaged from said shoulder by movement of said shafts in the reverse direction by said spring means, power actuated means for rocking said shafts against the action of said spring means, selector plates rockable on said shafts and companion to said shifter plates, said shifter plates provided with rims and spaced shoulders to control the access of said latch members to the shoulders in the shifter plates and pins carried by said latches to engage said selector plates to actuate said selector plates and limit the movements thereof.

4. In a gear shift mechanism, two shafts geared together for limited movements in opposite directions and having spring means to hold the same in a normal position at one of the limits of said movements, shifter plates mounted to rock on said shafts, said shifter plates having spaced shoulders, latch members carried by said shafts to engage one of said shoulders to rock said shifter plates in one direction and to be disengaged from said shoulder by movement of said shafts in the reverse direction by said spring means, power actuated means for rocking said shafts against the action of said spring means, selector plates rockable on said shafts and companion to said shifter plates, said shifter plates provided with rims and spaced shoulders to control the access of said latch members to the shoulders in the shifter plates and pins carried by said latches to engage said selector plates to control the movement of said selector plates and limit the movement thereof.

5. In a gear shift mechanism, two shafts geared together for rocking movements in opposite directions, means for limiting such movements and having spring means to hold the same in a normal position, shifter plates mounted to rock on said shafts, said plates having spaced shoulders, latch members carried by said shafts to engage one of said shoulders to rock the shifter plates in one direction and to be disengaged from said shoulder by movement of said shafts in reverse direction by said spring means, selector plates rockable on said shafts and associated with said shifter plates for controlling the engagement of said latch members with the shifter plates and power actuated means operating in one direction for rocking said shafts against the action of said spring means.

6. In a gear shift mechanism, two shafts geared together for rocking movements in opposite directions, means for limiting such movements and having spring means to hold the same in a normal position, shifter plates mounted to rock on said shafts, said plates having spaced shoulders, latch members carried by said shafts to engage one of said shoulders to rock the shifter plates in one direction and to be disengaged from said shoulder by movement of said shafts in reverse direction by said spring means, selector plates rockable on said shafts and associated with said shifter plates for alternately controlling the engagement of said latch members with the shifter plates, and power actuated means operated in one direction for rocking said shafts against the action of said spring means.

7. In a gear shift mechanism, two shafts geared together for limited movement in opposite directions and having spring means to hold the same in a normal position at one of the limits of said movement, shifter plates mounted to rock on said shafts, said plates having spaced shoulders, latch members carried by said shafts to engage and disengage from one of said shoulders to rock the shifter plate in one direction and to be disengaged from said shoulder by movement of said shafts in the reverse direction by said spring means, and power actuated means for rocking said shafts against the action of said spring means, and neutralizing plates on said shafts geared together for movement in opposite directions, said plates provided with opposed recesses in their rims, each terminating at one end with an arresting shoulder and the other with a cam shoulder, and pins carried by said latch members shiftable longitudinally and alternately from projection into one of said recesses into the opposite recess.

8. In a gear shift mechanism, two shafts geared together for limited movements in opposite directions and having spring means to hold the same in a normal position at one of the limits of said movement, shifter plates mounted to rock on said shafts, said plates having spaced shoulders, latch members carried by said shafts to engage and disengage from one of said shoulders to rock the shifter plates in one direction and to be disengaged from said shoulders by movement of said shafts in the reverse direction by said spring means, power actuated means for rocking said shafts against the action of said spring means, neutralizing plates on said shafts geared together for movements in opposite directions, said plates provided with opposed recesses in their rims, each terminating at one end with an arresting shoulder and at its other end with a cam shoulder, pins carried by said latch members shiftable longitudinally from projection into one of said recesses into opposite recess, a spring actuated means restraining said neutralizing plates from rocking movement on said shafts, and manually operated means for unlocking said spring actuated locking means.

9. In a gear shift mechanism, two shafts geared together for limited movements in opposite directions and having spring means to hold the same in a normal position at one of the limits of movements, shifter plates mounted to rock on said shafts, said shifter plates having spaced shoulders, latch members carried by said shafts to engage one of said shoulders to rock said shifter plate in one direction and to be disengaged from said shoulder by said shafts in the reverse direction by said spring means, power actuated means for rocking said shafts against the action of said spring means, and selector plates companion to said shifter plates adapted in operation to confine latching engagement to one only of said shifter plates.

10. In a speed changing mechanism, to obtain low and reverse and second and high speeds, two supporting shafts geared together for limited rocking movements in opposite directions, each of said shafts having loosely mounted thereon at opposite sides of an intermediate point of its length a shifter plate with means for connecting them for the low and reverse, and said supporting shafts each having loosely mounted thereon a shifter plate with means connecting them together for high and second, selector plates and neutralizing plates companion to said shifter plates also loosely mounted on said shafts, latching members carried by said shafts for engaging said shifter plates, pins carried by the latching members for engaging the selector plates and setting means for said selector plates for causing interchangeable latching engagement of the shifter plates when said shafts are rocked.

11. In a speed changing mechanism to obtain low and reverse and second and high speeds, two supporting shafts geared together for rocking movements in opposite directions, said shafts having mounted loosely thereon at one side of a point intermediate its length a pair of shifter plates for low and reverse and selector plates companion to said shifter plates, and a pair of neutralizing plates for each pair of said shifter plates, latching members for engaging and actuating said shifter plates, said latches controlled for operation by said selector and neutralizing plates, a pawl for locking from action said neutralizing plates, and a setting means for releasing either of said pawls alone and also for selecting for operation the shifter plates of the low and reverse side or the high and second side.

12. In a speed changing mechanism to obtain low and reverse and second and high speeds, two supporting shafts geared together for limited rocking movements in opposite directions, said shafts having loosely mounted thereon at opposite sides of an intermediate point of their length a group of plates for low and reverse and a group of plates for high and second, said plates including shifter plates, selector plates and neutralizing plates, latches and pins carried by said supporting shafts for engaging and actuating each of said groups of plates, pawls for locking said neutral plates, setting means for the selector plates and releasing from locking position the appropriate of said pawls and means for rocking said supporting shafts to cause the actuation of the selected shifter plates.

13. In a gear shift mechanism, two supporting shafts geared together for limited movements in opposite directions and having spring means to hold the same in a normal position at one of the limits of its movements, shifter plates mounted to rock on said shafts, said shifter plates having spaced shoulders, latch members carried by said supporting shafts to engage one of said shoulders to rock said shifter plates in one direction and to be disengaged from said shoulders by movement of said supporting shafts in reverse direction by said spring means, power actuated means for rocking said shafts against the action of said spring means, selector plates rockable on said shafts, said selector plates being companion to said shifter plates, said shifter plates provided with rims and spaced shoulders to control access of said latch members to the shifter plates, pins carried by said latches to limit the movements of the companion plates, two pairs of neutralizing plates, each pair geared together and also rockable on said supporting shafts, said pairs of neutralizing plates each provided with a stop pawl to lock it from movement, and setting means for said selector plates including a shaft extended between said plates, said shaft having a collar fixed thereon provided with offset parallelly extended bits, and said shaft having two lugs and a laterally extended lifter member thereon for respectively engaging and holding a selector plate and releasing the pawl of a pair of neutralizing plates, spring means for holding said lifter plate in a normal position with reference to said shaft, and means for rocking said setting means and holding the same in set position.

14. In gear shifting mechanism for engaging speed gears for low and reverse and second and high speeds, a pair of supporting shafts geared together and having thereon at each of the opposite sides of their length the following instrumentalities, a pair of shifter plates, and a pair of neutralizing plates, selector plates for said shifter plates, latching members carried by said supporting shafts for engaging one at a time said shifter plates, pins carried by said latches for engaging said selector and neutralizing plates, and means for setting the selector plates.

15. Selecting and setting means for a gear shift mechanism having selector plates such as herein described said selecting and setting means including a shaft extending between said selector plates, said shaft having a collar fixed thereon provided with offset axially extended bits, a sleeve having two lugs and a laterally extended lifter member provided with a stop to limit by contact with one of said bits upon the movement of the sleeve and lifter member, and a coil spring on said sleeve tending yieldingly to hold said lifter member against a bit of the collar, and means for rotating and setting said shaft.

16. In a gear shifting mechanism, two supporting shafts and means whereby they can be rocked on their axes in opposite directions, gear shifter means loosely mounted to rock transversely on said supporting shafts, selector means for said shifter means, said selector means also rockable on said supporting shafts, means for setting said selector means, and latching members carried by said supporting shafts for operatingly engaging said shifter means one at a time.

17. In a gear shifting mechanism, two supporting shafts and means whereby they can be rocked in opposite directions, gear shifting means loosely mounted on said supporting shafts, selector means for each of said gear shifter means, and latching members carried by said supporting shafts for operatingly engaging said shifter means, one of said shifter means adapted to hold one of said selector means from operation when the other shifter means is to be operated.

18. In a gear shifting mechanism, two supporting shafts and means whereby they can be rocked in opposite directions, gear shifter means loosely mounted on said supporting shafts, selector means for said shifter means, means for setting said selector means, latching members carried by said supporting shafts for operatingly engaging said shifter means one at a time, neutralizing means for said shifter means controlled by the selector means, and pins carried by said supporting shafts for engaging said selector and neutralizing means.

19. In a gear shifting mechanism, two supporting shafts and means whereby they can be rocked in opposite directions, gear shifter means loosely mounted on said supporting shafts, selector means for each of said shifter means, means for setting one of said selector means and locking the other, latching members carried by said supporting shafts for operatingly engaging the selected shifter means, neutralizing means for said shifter means controlled by the selector means, and pins carried by said supporting shafts for engaging said selector and neutralizing means.

20. In a gear shifting mechanism, two supporting shafts and means whereby they can be rocked in opposite directions, gear shifter means loosely mounted on said supporting shafts, selector means for each of said shifter means, means for setting one of said selector means and locking the other, latching members carried by said supporting shafts for operatingly engaging the selected shifter means, neutralizing means for said shifter means controlled by the selector means, pins carried by said supporting shafts for engaging said selector and neutralizing means, and means for unlocking one of said neutralizing means and locking the other by the actuation of a shifter means.

21. In a gear shifting mechanism, two supporting shafts rockable in opposite directions, means tending to hold said shafts in a normal position, gear shifter means on said shafts, latch members carried by each of said supporting shafts adapted to operatingly engage the shifter means carried by its shaft to rock the shifter in one direction and be disengaged from such shifter when rocked in the opposite direction by the means tending to hold said supporting shafts in normal position, selector means companion to each of said shifter means to confine the aforesaid latching engagement to one only of said shifter means, and means for rocking said supporting shafts out of said normal position for effecting gear shifting selection.

22. In a gear shifting mechanism, two supporting shafts and means whereby they can be rocked in opposite directions, gear shifter means loosely mounted on said supporting shafts, selector means for said shifter means, means for setting said selector means, latching members carried by said supporting shafts for operatingly engaging said shifter means one at a time, neutralizing means for said shifter means controlled by the selector means, pins carried by said supporting shafts for engaging said selector and neutralizing means, and means actuated by said setting means for holding at will both of said selector means out of engaging position.

JAMES S. ALSPAUGH.